Aug. 4, 1925.  1,548,539
M. L. MARTUS ET AL
PROCESS OF MAKING BATTERY ELEMENTS AND PRODUCTS THEREOF
Filed March 5, 1923   2 Sheets-Sheet 2
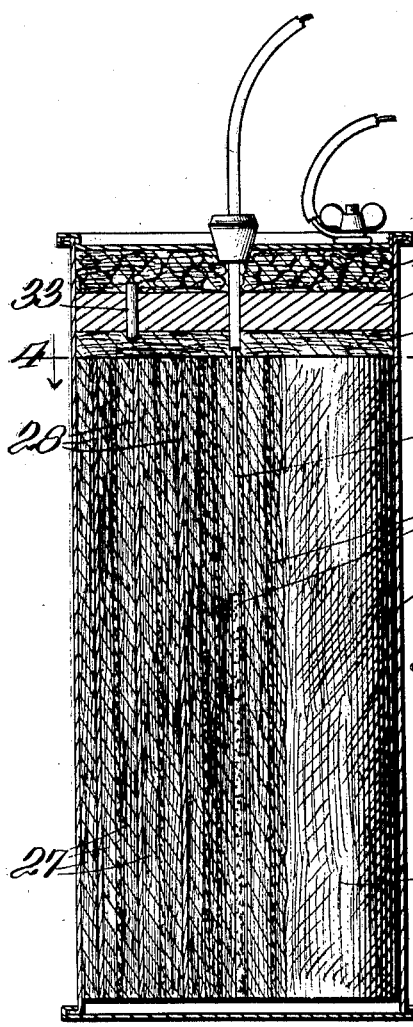
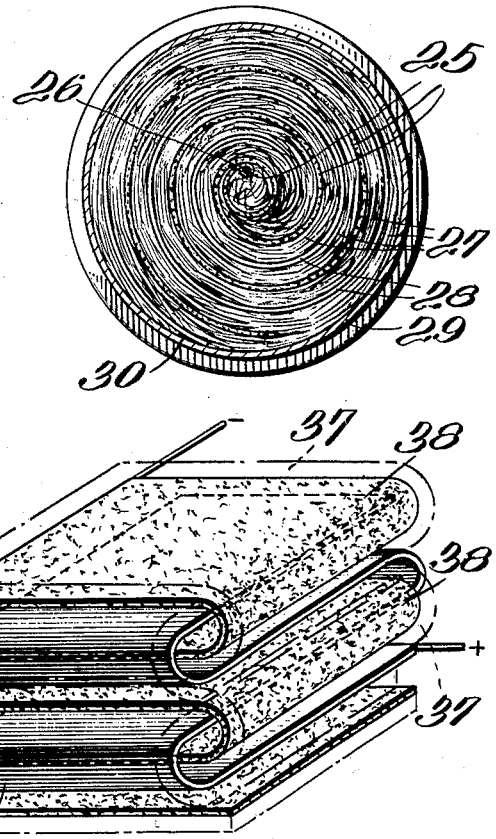
Inventors
M. L. MARTUS
J. G. ROSS and
E. H. BECKER.
By K. P. McElroy
Attorney Patented Aug. 4, 1925.

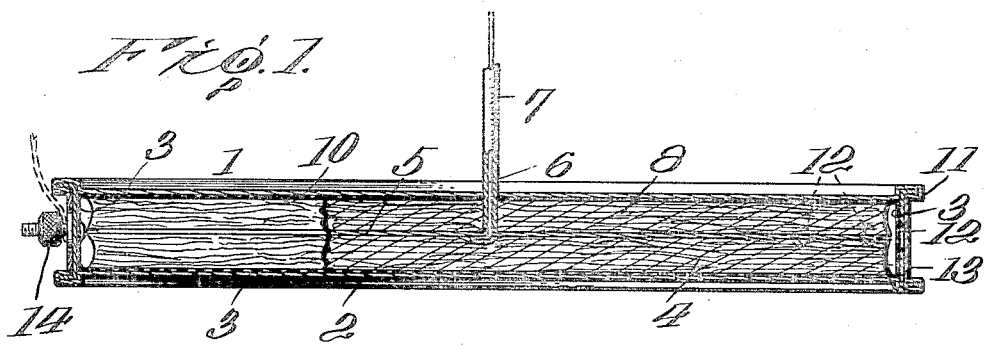

1,548,539

UNITED STATES PATENT OFFICE.

MARTIN L. MARTUS, OF WOODBURY, AND JAMES G. ROSS AND EDMUND H. BECKER, OF WATERBURY, CONNECTICUT.

PROCESS OF MAKING BATTERY ELEMENTS AND PRODUCTS THEREOF.

Application filed March 5, 1923. Serial No. 622,876.

*To all whom it may concern:*

Be it known that we, MARTIN L. MARTUS, JAMES G. ROSS, and EDMUND H. BECKER, all citizens of the United States, said MARTUS being a resident of Woodbury, in the county of Litchfield and State of Connecticut, and said Ross and said BECKER being residents of Waterbury, in the county of New Haven and State of Connecticut, have invented certain new and useful Improvements in Processes of Making Battery Elements and Products Thereof, of which the following is a specification.

This invention relates to processes of making battery elements and products thereof; and it comprises a method of making "dry cells" particularly adapted for closed circuit work wherein a conductive metal framework, which may be wire gauze or sheet iron (or both) is provided with a thin clinging layer of a solid depolarizing agent, usually copper oxid, by moistening said framework with an adhesive liquid, which is usually a thick solution of an alkali silicate, to serve as a temporary binder and sprinkling or otherwise treating the wetted surface with a certain amount of dry depolarizer, that which is not taken up and held by the adhesive liquid being brushed or dusted off, the framework so covered with the depolarizing agent being then assembled with a positive element and with an intermediate dry porous spacing element under some pressure, the whole assemblage being finally treated with a solution of a suitable electrolyte, usually caustic alkali, whereby the porous spacing element swells and holds the initially formed thin layer of depolarizer firmly against the conductive metal framework; and it further comprises an electric cell or battery comprising a negative element carrying a thin uniform layer of granular or flaky depolarizer, usually copper oxid, on one or both sides, said layer not being over two or three granules deep at any given point and being too thin to have any substantial degree of rigidity, said negative element being usually assembled with a positive element through the intermediacy of a spacing element of cotton linters; all as more fully hereinafter set forth and as claimed.

A common type of galvanic cell or battery element for dry cell purposes uses copper oxid, or copper oxids, as a depolarizer, with a caustic alkali electrolyte; generally caustic soda, although caustic potash is sometimes used. Usually, a mass of copper oxid is formed into a block or body of a shape adapted to serve as an electrode in the completed cell with the aid of binders and, generally, of hydraulic pressure. This element is assembled with a zinc positive element in a suitable container. Sometimes, the copper oxid is sintered into a coherent body; somtimes, but more rarely, it is used as a loose mass in a bag or container. Very many patents have been taken out on cells of this general type and the cells commercially made are excellent for open circuit purposes. On closing the circuit, however, the initial voltage quickly undergoes a considerable drop and these cells are therefore not adapted for closed circuit work. In these elements, the granules in nearest proximity to the positive element furnish most of the current and this current must be transmitted through other copper oxid granules to the conductive metal forming the holding element and the current conductor, so that the arrangement is equivalent to the inclusion of a high resistance (the intermediate copper oxid granules) in circuit, with a consequent voltage drop as the curernt flows. The same voltage drop in closed circuit occurs in other cells using a granular depolarizer and for similar reasons.

It is the object of the present invention to provide a high capacity cell for closed circuit work, giving a relatively large current flow without much voltage drop over long periods. To accomplish this end, we provide a structure in which practically all the granular depolarizing agent is in direct conductive relationship to the conductive metal framework or holding element and current conductor.

The relationship of all, or substantially all of the particles of depolarizing agent to the current conductor is the same; there is not the differential relationship existing in thick layers or bodies of granular material. Under the present invention, a dry cell may be provided which gives a substantially constant current for many hours without a serious voltage drop following immediately after closing the circuit. We shall hereinafter describe our invention more particularly as embodied in a cell using copper oxid as the depolarizing agent. In these embodiments, we ordinarily use as the metal holding element a thin sheet of sheet iron or wire gauze. Other metals than iron may be used, and their use is sometimes convenient; but for ordinary dry cell purposes, where an alkaline electrolyte is used, iron or steel does well. In order to give greater surface to the sheet metal or netting, it may be corrugated. Another expedient to the same end is to use sheet metal with a covering layer of perforated metal or wire netting; the perforations or the mesh of the netting in this case being larger than the granule size used. As a current conductor however we often use merely ordinary fine mesh galvanized iron wire gauze, such as is used for window screens and like purposes. Galvanized metal in this use has certain specific advantages, one of them being that in use the small amount of zinc on the surface reduces a little of the copper oxid and gives good contact. In making the cells, the framework is first covered, by dipping, by painting or otherwise, with a wetting film of a comparatively thick and viscid temporary binder. Ordinarily, there is used a solution of commercial waterglass or silicate of soda; sometimes called "sodium silicate." The wetting gives the element a thin sticky coating layer and on this is next sprinkled or dusted dry granular copper oxid of any convenient fineness. This gives a thin, uniform covering layer of the oxid, stuck to the holding element by the temporary binder. This layer is not ordinarily more than two or three flakes or grains deep at any given point if the proper amount of temporary binder has been properly applied to the framework. Any excess of copper oxid which does not come in contact with the binder can be, and is, blown or dusted off. One or both sides of the metal element may be so treated. After application of the copper oxid, the element may be dried somewhat, if desired. By the stated use of corrugated metal or netting covered sheet metal somewhat more active surface may be obtained without forfeiting thinness of layer. The element is next assembled with a sheet zinc positive element of corresponding shape with a layer of porous material between the two; this porous material being applied dry. Ordinarily, for reasons later appearing, a sheet of cotton linters or other resilient swellable cellulose material, is used. Assemblage is under some pressure, the resilient spacing element being compressed and exerting pressure against the depolarizing layer. The whole is then wet with the amount of caustic alkali solution required as an electrolyte. Caustic soda solution is ordinarily used. This caustic soda solution is taken up by the dry spacing layer and swells it; thereby producing further pressure between the negative and the positive elements and holding the copper oxid layer firmly and fixedly in contact with the conductive holding element. The cell or battery is now ready for use; and it will be found to give a substantially constant current on closed circuit for many hours; or until the activities of the zinc and of the copper oxid are substantially exhausted. This is ascribed to the fact that all the granules are in good individual contact with the conductor. In one typical cell so made, the initial voltage of 0.658 after 48 hours running on continuous closed circuit at a discharge rate of ½ ampere, had only dropped to 0.595.

Instead of copper oxid, many other granular depolarizing agents may be employed, such as manganese oxid, cobalt oxid, nickel oxid, ceria, iron oxids, lead oxids, etc. Certain amounts of such other oxids may at times be used in connection with copper oxid. When copper oxid is employed, it may be in any of the usual technical or commercial forms, such as mill scale. In using the copper oxid, it is ground to any convenient size. For many purposes, a fineness of about 40 mesh serves well. Mill scale and similar grades of copper oxid, on comminution, break up to a flaky material and these flakes are better adapted for the present purposes than a more granular product. As the alkaline electrolyte, caustic soda solution is ordinarily employed but caustic potash may be employed. In some instances, a mixture of the two alkalis is advantageous. Ammonia and other forms of alkaline electrolyte are less advantageous. Sometimes, a small amount of lithia in the alkaline electrolyte seems to exercise a sort of advantageous catalytic effect. Other catalyzing agents soluble in alkali solutions, such as vanadium, molybdenum, cerium, etc., oxids and compounds are sometimes convenient and advantageous adjuncts. Where copper oxid is employed, it is sometimes desirable to give it one of the known sulfurizing treatments.

Many convenient practical embodiments of the described invention may be devised; some of which are shown in the accompanying illustrations. If the holding element is wire gauze, since the layer of copper oxid is too thin to have any amount of rigidity, the negative element and a thin sheet zinc element with an intermediate layer of cotton linters may be easily rolled into a spiral or other convenient form. In other embodiments, where a thin sheet of iron is used as the holding element, two negative elements and a positive element with intervening layers of dry spacing material, such as linters, may be assembled and seamed together. Where high amperage batteries are wanted, it is convenient to make the two end elements of sheet metal with intervening elements of wire gauze; all coated with copper oxid as described. A zinc sheet and dry spacing elements of course occur between every two layers of copper oxid. The whole may be assembled as just described and seamed together.

In the accompanying illustration—

Figure 1 is a central vertical section of a simple dry cell unit under the present invention;

Figure 2 is a similar view of a modified form designed for high amperage;

Figure 3 is a central vertical section of another form of high amperage cell;

Figure 4 is a central horizontal section along line 4—4 of Figure 3; and

Figure 5 is a detail view of still another modification.

Referring first to Figure 1, element 1 is a sheet metal container provided with a bottom 2 seamed thereon. Interiorly, the sides and bottom are provided with a layer 3 of granulated or flaky copper oxid, or other depolarizer, applied as hereinbefore described. Placed against this bottom layer is a layer 4 of cotton linters or other absorbent material placed in position dry. Superimposed upon this again is a sheet of zinc 5 having conductor 6 with insulation 7 secured thereto. Above the zinc plate is another layer of cotton linters or the like 8. The cell is completed by a top 9 carrying layer 10 of depolarizing material and seamed to the sides of the container at 11. All the elements as so far described are assembled together dry, the absorbent layers in assemblage being placed under some pressure. After assemblage the container is immersed in a solution of suitable electrolyte, such as caustic soda solution. This enters the container through orifices 12 provided for that purpose, and swells the absorbent layers. The force of the expansion is against the layer of depolarizer on the one side and the zinc element on the other and the depolarizer is held firmly in place.

If the container used for immersion be of suitable size and shape, the assemblage made so far described may be left in the body of electrolyte and it will then function as a wet cell. Ordinarily however we use it as a dry cell, removing it from the electrolyte bath, draining, washing and drying; after which it may be painted or varnished, or otherwise decorated, as desired. It is then ready for use. After completion of the cell, a rubber band 13 may be slipped in place over the described inlets to cover them. In use it serves as a sort of valve. The container may be provided with a suitable, conventionally shown, electrical connection 14.

In providing the bottom and top with the described layer of depolarizer, the temporary binder used is ordinarily commercial waterglass although starch paste and many other adhesives may be used as a temporary binder. In using soda waterglass it is desirable to admix more or less potash waterglass, say 20 per cent or so since the binder so made does not dry so quickly or become so stiff as soda waterglass used alone. For similar reasons in using starch paste, an addition of potash solution is desirable. After moistening the surface with the temporary binder, flaky copper oxid of, say, 40 mesh is dusted or otherwise distributed on it. Some comes in contact with the binder and some does not. The latter does not stick and is dusted or brushed off or simply allowed to fall off by inverting the metal. As the porous, expansible septum between the depolarizing material and the zinc, we find it best to use commercial cotton linters but instead of linters, other forms of cellulose, such as paper pulp, may be employed. Linters and paper pulp have the advantage for the present purposes that they are not dissolved by caustic alkali and do not contaminate the electrolyte. The action of the soda on the cellulose is to swell the fibers laterally and produce the described type of pressure. The lateral expansion of the fibers is attended with some longitudinal contraction; and a disk of linters or paper pulp therefore contracts somewhat radially, for which fact allowance must be made. An advantage of cellulose for this purpose is the fact that as the electrolytic action goes on and zinc, or zinc oxid, dissolves in the caustic soda to form zincate, the zinc oxid is taken up by the cellulose in some form of combination. The net effect is to reduce the concentration of dissolved zinc compounds next the zinc and thereby contribute considerably to the described steadiness of work on closed circuit. However, other dry porous materials may be used which will swell on moistening, such as lime, magnesia, dolomitic lime, etc. Pure lime used by itself swells somewhat too much and takes up and fixes too much of the water of the electrolyte. However, an air slaked lime or mixture of lime and carbonate of lime is free from this disadvantage, as is magnesia and highly magnesian lime. These basic porous fillers have the advantage of fixing any $CO_2$ that may enter or be present in the assemblage and maintaining the causticity of the electrolyte. To some extent, they also abstract zinc oxid from solution.

With either type of filler or spacing layer, we find that the cell after a period of use may be revived by passing a current through it; or, in other words, it may be used as a secondary cell. Use, regeneration and reuse may go on for long periods.

In Figure 2, the structure in principle is much the same as in Figure 1; but to obtain an increased amperage, a plurality of zinc disks (5) is employed; these zincs being connected in parallel to a common insulated current conductor 15, shown as arranged at one side. Between each pair of zincs is a depolarizing element 16. As shown this depolarizing agent consists of a disk of wire gauze, which may be ordinary galvanized window screen netting in making up small cell units. As shown, the gauze is faced on each side with a thin layer of copper oxid applied in the manner described. In large scale work, a sheet of wire gauze is dipped in silicate solution, powdered with copper oxid on one side, dusted to remove excess, given a 180 degree turn and similarly treated on the other side and then cut into disks of the right size. Between the depolarizing disk and the zinc in each case is a sheet of absorbent material (4) as in Figure 1. The whole assemblage is held between two porcelain or hard rubber shouldered elements 17 and 18 on a central rod 19, which also serves as a current conductor, being electrically connected to the depolarizing disks. At the lower end it is provided with a threaded extension and nut 20, while above 18 it is provided with a swaged extension 21. The whole assemblage is in container 22, shown as of sheet metal with a top 23 seamed on. Through this top, the current leads pass through suitable bushings 24. In making up this unit, the several layers of zinc, absorbent material and depolarizing material may be assembled on the central rod and the assemblage dipped in electrolyte, then placed in position in the container and the top seamed on. Before placing in position, it is well to let the assemblage drain for a time, but any drip there may be is taken up by container 22.

The structure shown in Fig. 2 is also adapted for use as a wet cell. For this purpose the container is simply filled with electrolyte to the desired level. This may be done by the consumer, thereby obviating "shelf loss."

In the forms of our invention shown in Figures 3 and 4, a sheet of wire gauze, which may be fly screen mesh and is advantageously galvanized, is faced on both sides with a thin layer of copper oxid held in place by a temporary binder in the manner described. The two layers of copper oxid, if properly applied, do not interfere materially with flexibility. A sheet of coated gauze 25 is provided at one end with current conductor 26 and is assembled with a sheet of cotton linters 27 and a sheet of zinc 28 and the whole rolled into a tight spiral, which is placed in sheet zinc container 29; the zinc sheet being soldered or otherwise electrically connected thereto at 30. In this structure as shown, the stated assemblage may be covered with a horizontal layer 31 of cotton linters or other absorbent. Above this may be the usual layer of wax or the like 32, which may or may not be vented as shown at 33. Above this again may be a layer of lime or the like 34 serving as a $CO_2$ filter. The assemblage of zinc, absorbent and depolarizer is soaked or immersed in electrolyte prior to placing in position in the container.

In the structure of Figure 5, zinc strip 36, linters 37, and flexible copper oxid plate 38, are folded together; the folds in one element being at right angles to the folds in the other two. After folding, they are compressed together and placed in a suitable casing; after which the electrolyte is supplied as before.

In various forms of our invention as so far described, the depolarizer has been affixed to sheet metal or wire gauze by a temporary binder and the coated metal assembled with a zinc plate and a dry intermediate layer whose swelling with the electrolyte serves to hold the depolarizer fixedly in place thereafter. But it is quite within the scope of our invention to reverse this procedure and affix the depolarizer to the swellable intermediate layer. On assemblage with a sheet metal disk or plate and a zinc disk or plate and wetting with electrolyte, swelling of the intermediate layer takes place and the depolarizer grains are fixedly held against the metal as before. For example, a sheet of cotton linters which is advantageously somewhat moist may be dipped in, or painted with, silicate of soda and copper oxid dusted on one side. The sheet is next dried and assembled with a corresponding zinc plate and a sheet metal or wire gauze plate; and the whole wetted as before. Paper, cloth and various other fibrous materials may be used in the same way as cotton linters. In still another variant of our invention, the depolarizer may be applied as a special layer; and this is sometimes convenient in large scale work. For example, a sheet of cheesecloth or other light fabric with wide meshes may be treated with a temporary binder and then with dry depolarizer, the excess being dusted or blown off as before. On drying, this gives a fairly flexible thin sheet of depolarizer which may be cut into shape and assembled with metal elements and a spacing element of cotton linters, etc.; the whole assemblage being finally wetted to swell the spacing element and hold the depolarizer firmly against the pole piece. The cheesecloth, etc. may of course be cut to shape prior to covering with depolarizer.

The described invention is particularly convenient and advantageous in the production of cells having manganese oxid as the depolarizer; and particularly where such cells are to be regenerated after use—are to be used as secondary cells. While manganese dioxid is an excellent depolarizer, its conductivity is not great and where it is regenerated in a used cell or is formed in place, it is difficult to retain the oxid in electrical contact with the pole piece. This difficulty does not obtain where, as in the present invention, the layer of depolarizing agent is very thin and is maintained in positive contact with the pole piece by the pressure of swelled cellulose or the like. In using the cell as a secondary, the manganese oxid formed at the pole from dissolved manganese salts by the action of the current is retained in contact with the pole by the action of the spacing element; it cannot wash off. The same considerations are true of other depolarizing oxids.

In some embodiments of our invention in producing a light-weight article capable of storage for indefinite periods of time, as on shipboard, without "shelf loss", dry caustic soda is placed in the container, or used as a layer in building up the assemblage of elements described and the whole structure sealed against access of air. When use of the cell is wanted, an orifice in the container is opened and the necessary amount of water allowed to enter. In the structure of Fig. 3, water may be added through vent opening 33. In Fig. 2, an opening may be punched in the cover and enough water added to half fill the container, if it is to be used as a wet cell or merely enough to produce wetting of the spacing layer, if it is desired to use it as a dry cell.

What we claim is:—

1. In the manufacture of dry cells for closed circuit purposes, the process which comprises covering a metal conductor element with a wetting film of temporary binder, covering with dry granulated copper oxid, removing non-adhering oxid and assembling the coated conductor element with other cell elements under pressure.

2. In the manufacture of dry cells for closed circuit purposes, the process which comprises covering a metal conductor element with a wetting film of temporary binder, covering with dry granulated depolarizing agent, removing non-adhering granular material and assembling the coated conductor element with other cell elements under pressure.

3. In the manufacture of dry cells for closed circuit purposes, the process which comprises covering a metal conductor element with a wetting film of temporary binder, covering with copper oxid, removing non-adhering oxid, assembling the coated element with a zinc conductor and an intervening porous element and wetting the assemblage with caustic soda electrolyte to produce pressure in the assemblage by swelling of said porous element.

4. In the manufacture of dry cells for closed circuit purposes, the process which comprises covering a metal conductor element with a wetting film of temporary binder, covering with a dry granulated depolarizing agent, removing non-adhering granular material, assembling the coated element with a zinc conductor and an intervening porous element and wetting the assemblage with caustic soda electrolyte to produce pressure in the assemblage by swelling of said porous element.

5. In the manufacture of dry cells for closed circuit purposes, the process which comprises covering a metal conductor element with a wetting film of temporary binder, covering with copper oxid, removing non-adhering oxid, assembling the coated element with a zinc conductor and an intervening cellulose porous element and wetting the assemblage with caustic soda electrolyte to produce pressure in the assemblage by swelling of said porous element.

6. In the manufacture of dry cells for closed circuit purposes, the process which comprises covering a metal conductor element with a wetting film of temporary binder, covering with a dry granulated depolarizing agent, removing non-adhering granular material, assembling the coated element with a zinc conductor and an intervening cellulose porous element and wetting the assemblage with caustic soda electrolyte to produce pressure in the assemblage by swelling of said porous element.

7. In the manufacture of dry cells for closed circuit purposes, the process which comprises covering a metal conductor element with a wetting film of temporary binder, covering with copper oxid, removing non-adhering oxid, assembling the coated element with a zinc conductor and an intervening porous element composed of cotton linters and wetting the assemblage with caustic soda electrolyte to produce pressure in the assemblage by swelling of said porous element.

8. In the manufacture of dry cells for closed circuit purposes, the process which comprises covering a metal conductor element with a wetting film of temporary binder, covering with a dry granulated depolarizing agent, removing non-adhering granular material, assembling the coated element with a zinc conductor and an intervening porous element composed of cotton linters and wetting the assemblage with caustic soda electrolyte to produce pressure in the assemblage by swelling of said porous element.

9. In the manufacture of dry cells for closed circuit purposes, the process which comprises covering a metal conductor element with a wetting film of temporary binder, covering with a dry granulated depolarizing agent, removing non-adhering granular material, assembling the coated element with a zinc conductor and an intervening cellulose porous element composed of cotton linters and wetting the assemblage with caustic soda electrolyte to produce pressure in the assemblage by swelling of said porous element.

10. In the manufacture of dry cells for closed circuit purposes, the process which comprises covering a metal conductor element with a wetting film of a solution of alkali silicate, covering with dry granulated copper oxid, removing non-adhering oxid and assembling the coated conductor element with other cell elements under pressure.

11. In the manufacture of dry cells for closed circuit purposes, the process which comprises covering a metal conductor element with a wetting film of a solution of alkali silicate, covering with dry granulated depolarizing agent, removing non-adhering granular material and assembling the coated conductor element with other cell elements under pressure.

12. In the manufacture of dry cells for closed circuit purposes, the process which comprises covering a metal conductor element with a wetting film of a solution of alkali silicate, covering with copper oxid, removing non-adhering oxid, assembling the coated element with a zinc conductor and an intervening porous element and wetting the assemblage with caustic soda electrolyte to produce pressure in the assemblage by swelling of said porous element.

13. In the manufacture of dry cells for closed circuit purposes, the process which comprises covering a metal conductor element with a wetting film of a solution of alkali silicate, covering with a dry granulated depolarizing agent, removing non-adhering granular material, assembling the coated element with a zinc conductor and an intervening porous element and wetting the assemblage with caustic soda electrolyte to produce pressure in the assemblage by swelling of said porous element.

14. In the manufacture of dry cells for closed circuit purposes, the process which comprises covering a metal conductor element with a wetting film of a solution of alkali silicate containing both potassium silicate and sodium silicate, covering with dry granulated copper oxid, removing non-adhering oxid and assembling the coated conductor element with other cell elements under pressure.

15. In the manufacture of dry cells for closed circuit purposes, the process which comprises covering a metal conductor element with a wetting film of a solution of alkali silicate containing both potassium silicate and sodium silicate, covering with dry granulated depolarizing agent, removing non-adhering granular material and assembling the coated conductor element with other cell elements under pressure.

16. In the manufacture of dry cells for closed circuit purposes, the process which comprises covering a metal conductor element with a wetting film of a solution of alkali silicate containing both potassium silicate and sodium silicate, covering with copper oxid, removing non-adhering oxid, assembling the coated element with a zinc conductor and an intervening porous element and wetting the assemblage with caustic soda electrolyte to produce pressure in the assemblage by swelling of said porous element.

17. In the manufacture of dry cells for closed circuit purposes, the process which comprises covering a metal conductor element with a wetting film of a solution of alkali silicate containing both potassium silicate and sodium silicate, covering with a dry granulated depolarizing agent, removing non-adhering granular material, assembling the coated element with a zinc conductor and an intervening porous element and wetting the assemblage with caustic soda electrolyte to produce pressure in the assemblage by swelling of said porous element.

18. In the manufacture of dry cells for closed circuit purposes, the process which comprises covering a metal conductor element with a wetting film of a solution of alkali silicate containing both potassium silicate and sodium silicate, covering with dry granulated copper oxid, removing non-adhering oxid and assembling the coated conductor element with other cell elements under pressure.

19. As an element for closed circuit dry cells, a metal conductor carrying a surface film or thin layer of granulated copper oxid, substantially all the particles of said layer being in contact with said conductor.

20. As an element in closed circuit dry cells, a negative element composed of a metal conductor of extended surface carrying a film or layer of granulated copper oxid on one or both faces, all or most of the particles of said copper oxid being in contact with said conductor and the copper oxid layer or layers being of insufficient thickness to give any substantial rigidity to the structure as a whole.

21. As an element in closed circuit dry cells, a negative element composed of a metal conductor of extended surface carrying a film or layer of granulated depolarizing agent on one or both faces, all or most of the granules being in contact with said conductor and the granule layer or layers being of insufficient thickness to give any substantial rigidity to the structure as a whole.

22. A dry cell adapted for closed circuit work and comprising a metal conductor of extensive surface covered with a thin film or layer of granulated copper oxid, all or most of the granules of said layer being in contact with said conductor, said cell also comprising a zinc element and a porous spacing element located between the negative element and the zinc element and exerting pressure therebetween.

23. A dry cell adapted for closed circuit work and comprising a metal conductor of extensive surface covered with a thin film or layer of granulated depolarizing agent, all or most of the granules of said layer being in contact with said conductor, said cell also comprising a zinc element and a porous spacing element located between the negative element and the zinc element and exerting pressure therebetween.

24. A dry cell adapted for closed circuit work and comprising a metal conductor of extensive surface covered with a thin film or layer of granulated copper oxid, all or most of the granules of said layer being in contact with said conductor, said cell also comprising a zinc element and a porous cellulose spacing element located between the negative element and the zinc element and exerting pressure therebetween.

25. A dry cell adapted for closed circuit work and comprising a metal conductor of extensive surface covered with a thin film or layer of granulated depolarizing agent, all or most of the granules of said layer being in contact with said conductor, said cell also comprising a zinc element and a porous cellulose spacing element located between the negative element and the zinc element and exerting pressure therebetween.

26. A dry cell adapted for closed circuit work and comprising a metal conductor of extensive surface covered with a thin film or layer of granulated copper oxid, all or most of the granules of said layer being in contact with said conductor, said cell also comprising a zinc element and a porous spacing element composed of cotton linters located between the negative element and the zinc element and exerting pressure therebetween.

27. A dry cell adapted for closed circuit work and comprising a metal conductor of extensive surface covered with a thin film or layer of granulated depolarizing agent, all or most of the granules of said layer being in contact with said conductor, said cell also comprising a zinc element and a porous spacing element composed of cotton linters located between the negative element and the zinc element and exerting pressure therebetween.

In testimony whereof we have hereunto signed our names at Waterbury, Connecticut, this 3rd day of March, 1923.

MARTIN L. MARTUS.
JAMES G. ROSS.
EDMUND H. BECKER.